United States Patent [19]

Carter

[11] Patent Number: 5,248,483
[45] Date of Patent: Sep. 28, 1993

[54] APPARATUS AND METHODS FOR PRODUCING CERAMIC PRODUCTS

[75] Inventor: Michael C. Carter, Bartlesville, Okla.

[73] Assignee: Phillips Petroleum Company, Bartlesville, Okla.

[21] Appl. No.: 676,395

[22] Filed: Mar. 28, 1991

[51] Int. Cl.$^5$ .................. B01J 8/00; F28D 7/00; C01B 31/36; C04B 35/52

[52] U.S. Cl. .................. 422/187; 422/202; 422/245; 423/344; 423/345; 423/346; 501/88

[58] Field of Search ............ 422/187, 202, 245, 248; 423/344, 345, 346; 501/88

[56] References Cited

U.S. PATENT DOCUMENTS

| | | | |
|---|---|---|---|
| 2,670,275 | 9/1954 | Olson et al. | 23/204 |
| 2,677,627 | 5/1954 | Montgomery et al. | 423/346 |
| 3,025,192 | 3/1962 | Lowe | 423/346 |
| 3,236,780 | 2/1966 | Ozarow | 423/346 |
| 3,346,338 | 10/1967 | Latham, Jr. | 23/208 |
| 3,677,713 | 7/1972 | Evans | 422/150 |
| 3,871,445 | 3/1975 | Wanka et al. | 165/107 |
| 4,057,396 | 11/1977 | Matovich | 23/252 |
| 4,234,543 | 11/1980 | Matovich | 422/109 |
| 4,341,749 | 7/1982 | Iya et al. | 423/349 |
| 4,777,031 | 10/1988 | Senecal et al. | 423/632 |
| 4,789,536 | 12/1988 | Schramm et al. | 423/346 |
| 4,848,982 | 7/1989 | Tolle et al. | 48/69 |
| 5,108,729 | 4/1992 | Gerhold et al. | 423/346 |

OTHER PUBLICATIONS

*Chemical Engineers' Handbook*, 5th ed., New York, McGraw-Hill Book Company, 1973. pp. 11-10 and 11-26.

Primary Examiner—James C. Housel
Assistant Examiner—Christopher Y. Kim
Attorney, Agent, or Firm—William R. Sharp

[57] ABSTRACT

An apparatus and methods are provided for producing ceramic products in a reactor so as to minimize deposits therein. The reactor has a chamber defined therein which is divided into a combustion zone, into which a combustible mixture is injected, and a reaction zone in which the ceramic product is produced from at least one reactant injected into the chamber at the boundary between the zones. At least a portion of the wall defining the reaction zone is surrounded by at least one passageway through which coolant fluid is passed during ceramic production. Either carbide product or nitride product can be produced in the reaction zone according to the invention.

10 Claims, 6 Drawing Sheets

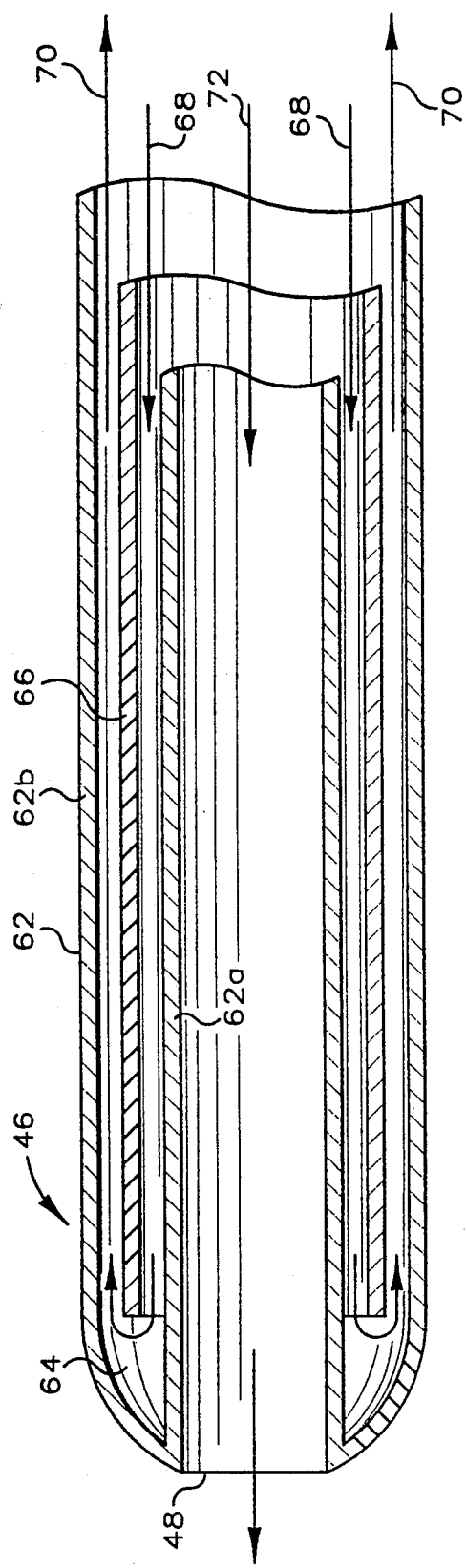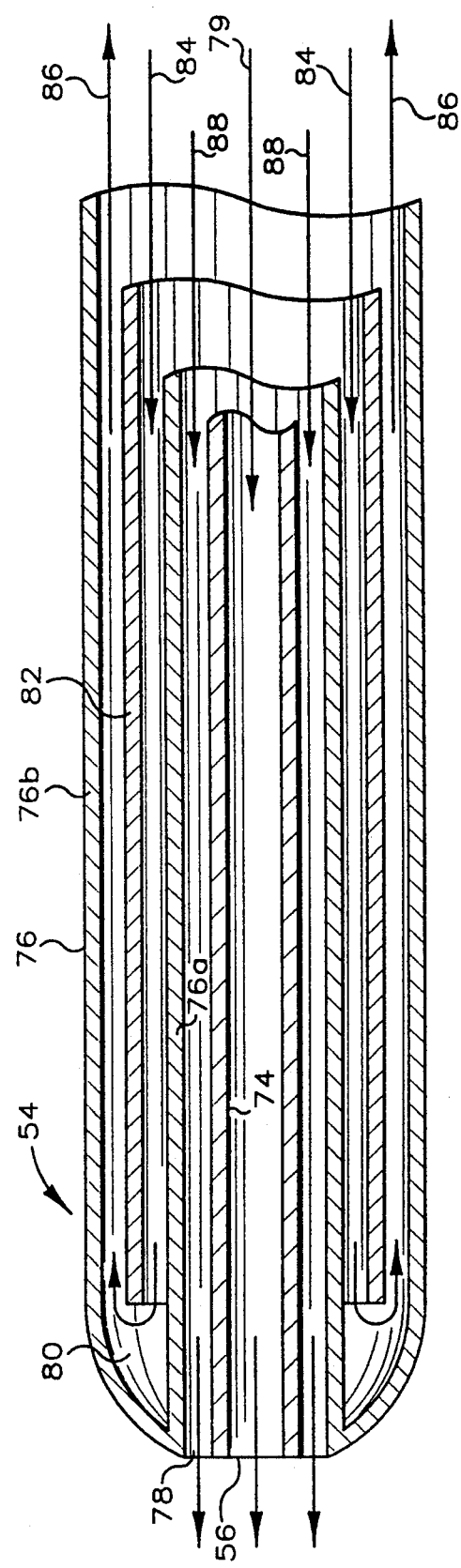
FIG. 3
FIG. 4

APPARATUS AND METHODS FOR PRODUCING CERAMIC PRODUCTS

BACKGROUND OF THE INVENTION

This invention relates to an apparatus and methods for producing ceramic products such as silicon carbide or silicon nitride.

Various ceramic powders, such as silicon carbide and silicon nitride, are useful in the fabrication of highly stressed, wear resistant ceramic parts, such as those employed in heat engines, turbo-charger rotors and heat exchangers. Although synthesis techniques involving plasma and laser heating of gaseous reactants have successfully produced ceramic powders, it would be desirable to synthesize sinterable ceramic products in a manner better suited to economical, large scale synthesis. In this regard, it is particularly advantageous to minimize the formation of deposits on walls of a ceramic production reactor so as to thereby minimize down-time for removing such deposits.

SUMMARY OF THE INVENTION

It is, therefore, an object of the invention to provide an apparatus and methods which are economical in producing ceramic products in a reactor and which minimize reactor wall deposits so as to be well suited to large scale synthesis.

The above object is realized by an apparatus comprising: a reactor having a wall defining a chamber therein which has a longitudinal axis and longitudinally separated upstream and downstream ends, wherein the chamber comprises a combustion zone and a reaction zone such that the combustion zone longitudinally extends from the upstream end to a boundary between the zones and such that the reaction zone longitudinally extends from the boundary to the downstream end; combustible mixture injection means for injecting a combustible mixture into the combustion zone so as to flow generally toward and into the reaction zone; reactant injection means for injecting at least one reactant into the chamber at the boundary, wherein the reactant(s) is capable of reacting in the reaction zone to form a ceramic product; means for defining at least a first passageway and a second passageway which surround at least a portion of the wall defining at least a portion of the reaction zone so as to be in heat exchange relationship with such wall portion and so as to be in heat exchange relationship with each other; and coolant fluid means for flowing a coolant fluid through the first and second passageways.

According to another aspect of the invention, a method is provided which comprises: providing a reactor as described above; establishing a flow of a combustible mixture in the combustion zone so as to flow in a direction generally toward the reaction zone, wherein the combustible mixture comprises a mixture of a fuel and an oxidant; combusting the combustible mixture in the combustion zone to produce hot combustion products which flow generally toward and into the reaction zone; injecting at least one reactant into the chamber at the boundary so as to flow with the hot combustion products into the reaction zone, wherein temperature conditions in at least a portion of the reaction zone are at least about 1400° C. and wherein the elemental molar ratio of carbon to oxygen for the combination of the combustible mixture and the reactant(s) is at least about 0.8:1, the reactant(s) being capable of reacting in the reaction zone to form a carbide compound; flowing a coolant fluid during reactant injection around and in heat exchange relationship with at least a portion of the wall which defines at least a portion of the reaction zone; whereby a product powder comprising the carbide compound is produced in the reaction zone and deposits on said wall portion are minimized.

According to yet another aspect of the invention, there is provided a method of producing a product powder comprising a nitride compound which is substantially similar to the method described above but which employs at least one reactant capable of reacting in the reaction zone to produce the nitride compound, a carbon to oxygen ratio of at least about 0.7:1, and a reaction zone temperature of at least about 1300° C.

According to a preferred embodiment of the invention, a coiled tube defines a first coolant fluid passageway therein and also defines between adjacent coiled portions of the tube a second coolant fluid passageway for receiving a flow of fluid therethrough in a direction opposite to that flow of coolant fluid through the first passageway. The flow of coolant fluid around the chamber-defining wall in accordance with the invention has been found to minimize or eliminate formation of deposits on the wall, thus minimizing down-time for cleaning and enhancing operational efficiency.

BRIEF DESCRIPTION OF THE DRAWINGS

FIGS. 3 and 4 are enlarged cross-sectional views of nozzles which are shown in FIG. 1.

DETAILED DESCRIPTION OF THE INVENTION

Figure 1:
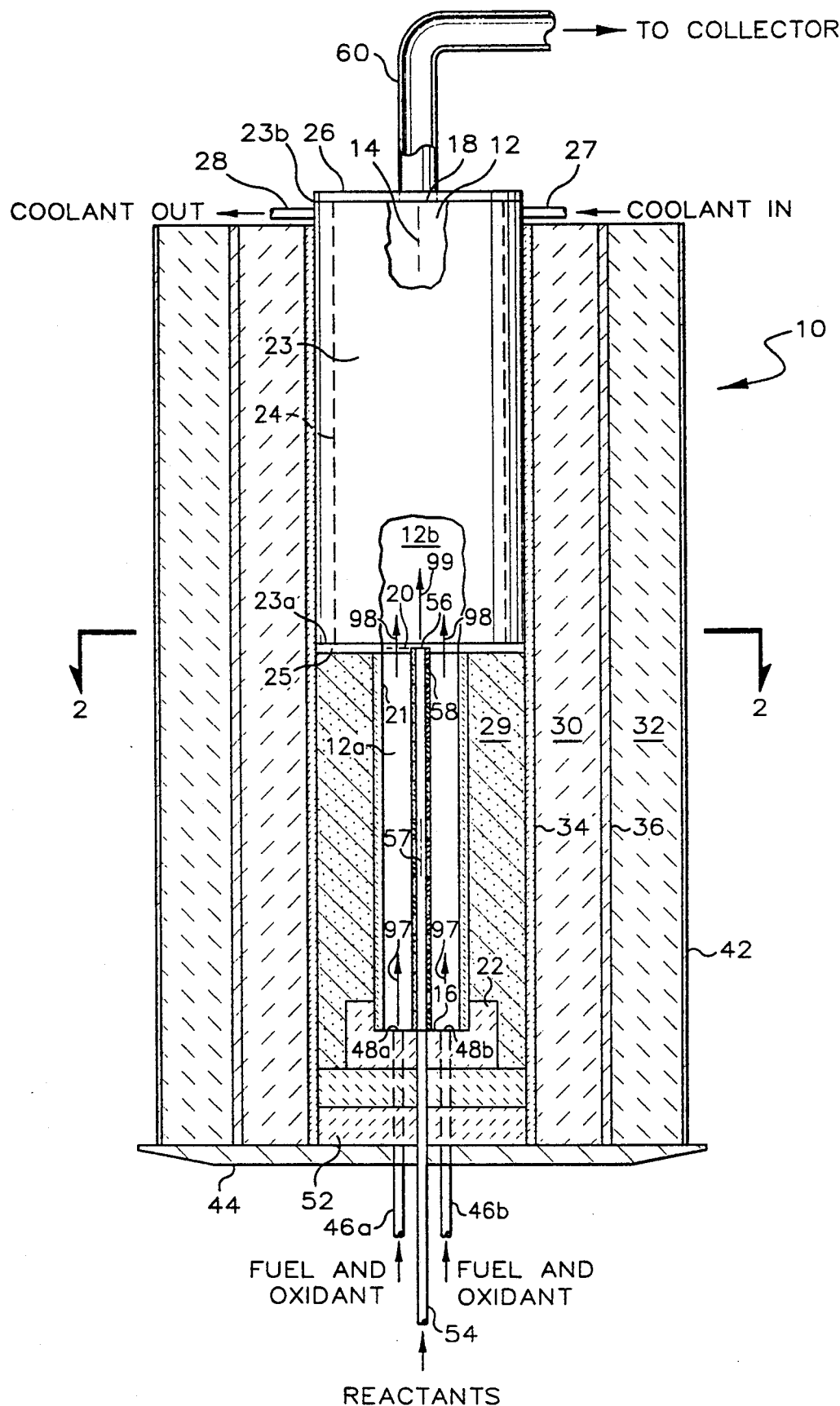
FIG. 1 is a partial cross-sectional view of a reactor having a cooling assembly in accordance with the invention and having a longitudinally extending reactant nozzle.

Referring to FIG. 1, there is shown a partial cross-sectional view of a reactor 10 having defined therein a chamber 12 which has a longitudinal axis 14 and longitudinally separated upstream and downstream ends 16 and 18, respectively. Chamber 12 includes a combustion zone 12a and a reaction zone 12b situated such that combustion zone 12a extends from upstream end 16 to an imaginary surface, in this case planar, boundary 20 between the zones and such that the reaction zone 12b extends from boundary 20 to downstream end 18.

In the illustrated embodiment, a first portion of chamber 12, including combustion zone 12a and having a first diameter, is defined by the wall of a refractory tube 21 and refractory insert 22. Such a refractory tube and insert are preferably composed of a refractory material resistant to temperatures of at least about 2000° C., such as zirconia, which is commercially available from Zircoa Products of Solon, Ohio. A second portion of chamber 12, including reaction zone 12b and having a second diameter larger than the above-mentioned first diameter, is defined by the interior surface of an inner wall of cooling assembly 23. A side view of cooling assembly 23 is shown in FIG. 1, with its interior surface indicated by broken lines at 24 and with two portions broken away to reveal reaction zone 12b as defined therein. The larger diameter reaction zone as defined within cooling assembly 23 has been found to assist in minimizing deposit formation on wall interior surface 24.

As shown, cooling assembly 23 has a first end 23a positioned between upstream end 16 and downstream end 18 and preferably closely adjacent to boundary 20, and further has a second end 23b adjacent to downstream end 18. End 23a is in contact with a generally annular member 25 and end 23b is in contact with a generally annular member 26. Most preferably, such annular members are composed of a material having a suitably low thermal coefficient of expansion, such as quartz, and are bonded to ends 23a and 23b by a suitable silicone sealant. Cooling assembly 23 further includes a cooling assembly inlet 27 connected to a source of coolant fluid and a cooling assembly outlet 28 through which coolant fluid exists cooling assembly 23 after having flowed therethrough in a manner which will be described below with reference to FIG. 2.

Also shown in FIG. 1 are several coaxially positioned layers of refractory material which are generally annular in shape, including: layer 29, surrounding tube 21 and preferably comprising zirconia powder insulation, available from Zircar Products of Florida, N.Y., which allows for contraction and expansion of this layer; layer 30, surrounding tube 21 and cooling assembly 23, which preferably comprises alumina-silica blanket insulation, commercially available under the trademark Fiberfrax ® from Carborundum of Niagara Falls, N.Y.; and layer 32, also surrounding tube 21 and cooling assembly 23, which may be of the same composition as layer 30. A refractory cylinder 34, preferably low density thermal insulating alumina available from Zircar Products of Florida, N.Y., is illustrated as separating layers 29 and 30, and a metal cylinder 36 most preferably composed of stainless steel separates layers 30 and 32. Cylinders 34 and 36 assist in providing structural support for the reactor.

The outermost refractory layer 32 is held in place by a cloth material 42, such as fiberglass, which wraps around the exterior surface of layer 32. The bottom end of the various layers are supported by a metal plate 44. The reactor is preferably oriented vertically as shown for the sake of operating convenience. If any of the refractory material breaks or cracks, it tends to stay in position if the various layers and tubes are vertically positioned. Therefore, operation can sometimes continue despite such structural defects. In addition, it is also possible to orient the reactor opposite to that shown such that the reaction zone 12b is at the bottom of the reactor and the combustion zone 12a is at the top of the reactor to thereby receive a flow of gases in a downward direction rather than an upward direction as illustrated. Such an orientation can facilitate cleaning of any deposits from the interior of cooling assembly 23 by allowing such removed deposits to fall from the cooling assembly by gravity after removal of annular member 26.

Each of combustion nozzles 46a and 46b are connected to a source of fuel and oxidant and have respective outlet ends 48a and 48b which communicate with combustion zone 12a of chamber 12 at a position closely adjacent to upstream end 16 of chamber 12. As shown, nozzles 46a and 46b are surrounded by refractory inserts 52 positioned near upstream end 16. Although not shown in FIG. 1, a third combustion nozzle 46c having an associated outlet end 48c is also provided. See FIG. 2 which shows all three combustion nozzles.

A single reactant nozzle 54 is connected to a source of reactants, discussed later in detail, and extends through refractory inserts 52 and from upstream end 16 of chamber 12 to an outlet end 56 which communicates with chamber 12 at boundary 20. As shown, nozzle 54 has a longitudinal axis 57 which in the illustrated embodiment is parallel to longitudinal axis 14 of chamber 12. Most preferably for the purpose of optimally minimizing wall deposits, longitudinal axis 57 corresponds to longitudinal axis 14 of chamber 12 such that outlet 56 is positioned substantially on longitudinal axis 14. A plurality of generally annular refractory members 58, preferably composed of a suitable temperature resistant material such as zirconia-based ZYFB3 as available from Zircar Products, are preferably stacked upon one another so as to surround nozzle 54 along its length within chamber 12. Other types of thermal insulating layers and coatings could also be employed. Such refractory members 58 minimize heat exchange between nozzle 54 and chamber 12 so as to thereby minimize heat loss from the chamber.

It is preferred for the purpose of minimizing wall deposits to position reactant nozzle outlet 56 and associated boundary 20, as shown, generally between the portions of chamber 12 defined by wall interior surface 24 and the wall of tube 21, respectively. Deposits can still be avoided to some extent, however, by positioning reactant nozzle outlet 56 at a position further upstream within tube 21. This is demonstrated in subsequent examples and may be desirable, for example, if it is desired to lengthen the reaction zone 12b and thus also lengthen the residence time of reactants in the reactor, and/or to position reactant nozzle outlet 56 at a location in tube 21 which is at a higher temperature. Desired positioning of the reactant nozzle outlet 56 can be easily adjusted in the embodiment of FIG. 1 by simply longitudinally withdrawing or extending reactant nozzle 54 from or into chamber 12. It is further desirable to provide chamber dimensions and position reactant nozzle outlet 56 sufficiently far downstream so that substantially all of the free oxygen ($O_2$ in its free gaseous state, uncombined with any other component) has reacted with the fuel to form combustion products before reaching boundary 20, thus avoiding the undesirable oxidation of one of the reactants. Another consideration in positioning of reactant nozzle outlet 56 includes the possible jet pump effect on reactants injected from reactant nozzle 54 which can pull the reactants upstream rather than the intended downstream flow if reactant nozzle outlet 56 is positioned too far upstream. As noted previously, it is also important to position reactant nozzle outlet 56 so that injected reactants are exposed to the proper temperature which is conducive to ceramic product formation.

Also shown in FIG. 1 is conduit 60, shown in partial cross section, which is connected at one end to annular member 26 so as to communicate with the downstream end 18 of chamber 12. Conduit 60 receives ceramic product powder therethrough which then passes to a suitable collector, discussed further below. Conduit 60 in the illustrated embodiment not only functions to transport the product to the collector, but also functions as a heat exchanger. The outside of conduit 60 is exposed to a cooling means such as ambient air which allows heat transfer via both natural convection and radiation. Such heat transfer effects cooling of the product powder as it flows through conduit 60, which is highly desirable in order to prevent undesirable reactions involving, for example, oxidation of the product to form unwanted oxides. In addition, such cooling of the product powder is desirable to prevent damage to the collector from excessively hot product. In instances where a cloth filter bag is used as the collector, conduit 60 should be of sufficient length to cool the product powder to a desired temperature, typically below about 100° C., before it enters the collector. Other types of collectors require less cooling. If desired, the cooling effect can be further enhanced by surrounding conduit 60 with a cooling coil or jacket having coolant fluid flowing therethrough.

With respect to materials for conduit 60, it is preferable that a non-metallic material be employed which will not add any undesirable metal contaminants to the product. If the desired product is silicon carbide or silicon nitride, for example, quartz (silicon dioxide) is preferred since molecular structures characterized by silicon-oxygen bonds are already present in the reactor product such that essentially no additional contaminants will enter the product stream. Quartz is also a particularly preferred material because of its high emissivity and excellent thermal shock resistance. However, other heat exchange materials, including metals, can be employed if desired.

The collector can be any suitable means of collecting the product powder. One suitable collector, as discussed above, comprises a cloth filter bag connected to the downstream end of conduit 60. Other suitable collectors include metal filters, electrostatic precipitators and cyclone separators. Of course, regardless of what type of collector is used, a pressure differential should preferably be established by a suitable pump across the collector to draw the product powder through conduit 60 and into the collector.

Figure 2:
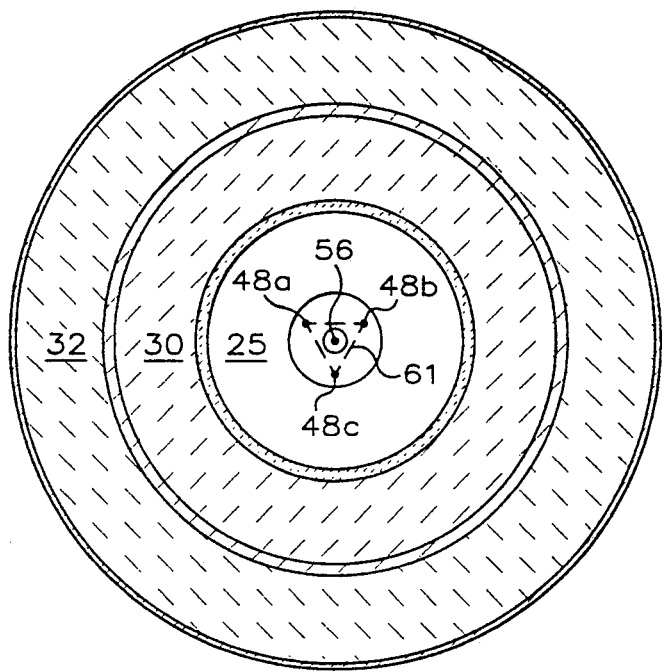
FIG. 2 is a cross-sectional view of the reactor shown in FIG. 1 as viewed along line 2—2.

Referring now to FIG. 2, this view shows all three combustion nozzle outlets 48a, 48b and 48c and their relative positions with respect to reactant nozzle outlet 56. As can be seen from FIGS. 1 and 2, the combustion nozzle outlets define an imaginary linear boundary 61 whose projection in a direction generally parallel to longitudinal axis 14 of chamber 12 and onto surface boundary 20 generally surrounds outlet 56. In operation, this feature advantageously provides a sheath of combustion products around reactants injected from outlet 56 so as to assist in minimizing wall deposits. In the particular embodiment illustrated, boundary 61 is generally triangular in shape and is positioned with respect to outlet 56 such that outlet 56 is generally centrally located within the above-mentioned projection of boundary 61. Most preferably, and as shown, the combustion nozzle outlets are equidistantly spaced from one another.

Referring to FIG. 3, there is shown a cross-sectional view of a portion of a combustion nozzle labeled as 46, which represents any one of the combustion nozzles 46a, 46b and 46c which are each identical in structure and operation. Nozzle 46 comprises a tubular member 62, preferably constructed of a metal such as stainless steel, which has an inner sidewall 62a and an outer sidewall 62b. Such sidewalls define a generally annular space 64 therebetween which is connected to a source of coolant fluid such as water or ethylene glycol. A tubular member 66 is positioned within annular space 64 so as to generally divide the space into entrance and exit passageways for the coolant fluid. As shown, coolant fluid flows toward the tip of nozzle 46 as indicated at 68, and flows away from the tip in the opposite direction as indicated at 70. The direction of coolant fluid flow may be reversed if desired. The flow of coolant fluid through space 64 assists in preventing melting of the metallic tubular members, and also assists in preventing the flame from burning back (flashback) into nozzle 46 by keeping the interior of nozzle 46 below the autoignition temperature of the fuel/oxidant mixture. The interior of nozzle 46 is connected to a source of fuel and oxidant such that a flow of the fuel/oxidant mixture is established through nozzle 46 as indicated at 72.

Referring to FIG. 4, there is shown a cross-sectional view of reactant nozzle 54 having outlet end 56. Nozzle 54 is preferably constructed of the same or similar metallic material as that used for nozzle 46, and includes tubular members 74 and 76. As shown, tubular member 74 is positioned generally coaxially within tubular member 76 such that a generally annular space 78 is defined between the interior surface of member 76 and the exterior surface of member 74. The interior of tubular member 74 is connected to a source of reactants to provide a flow of reactants therethrough as indicated at 79. Tubular member 76 is generally of the same design as member 62 in FIG. 3, and includes respective inner and outer sidewalls 76a and 76b between which there is defined a generally annular space 80. A tubular member 82 is positioned within annular space 80 so as to divide it into entrance and exit passageways. Space 80 is connected to a source of coolant fluid so as to establish respective entrance and exit flow paths 84 and 86. The reverse direction of coolant fluid flow can be employed if desired. The flow of coolant fluid not only assists in preventing melting of the metallic tubular members, but also helps prevent the formation of ceramic deposits within nozzle 54 by maintaining the temperature of the nozzle below temperature limits conducive to ceramic product formation. This avoids the need to periodically clean deposits from nozzle surfaces.

Annular space 78 is connected to a purge gas source to establish a flow of such purge gas through annular space 78 in the direction of outlet 56, as indicated at 88. Thus, this flow of purge gas exits outlet 56 in a generally annular stream so as to surround the reactants as they exit the nozzle. This annular gas stream forms a sheath around the reactants so as to prevent contact of the hot combustion gases in chamber 12 (see FIG. 1) with the reactants immediately after their exit from nozzle 54, thereby preventing the formation of ceramic deposits on the tip of nozzle 54. Such deposits, if not prevented, can eventually lead to blockage of reactant flow from reactant nozzle 54 and consequent reactor shutdown. Of course, the insulative sheath of purge gas disperses after only a few milliseconds, but this is sufficient time to allow the reactants to flow far enough away from the nozzle tip to prevent formation of undesirable deposits. The choice of purge gas is not critical, and can be, for example, an inert gas (i.e. helium or argon), a cooled waste gas as discharged from the reactor, or a reactive gas which can contribute carbon or nitrogen to the reactive stream for formation of carbides or nitrides, respectively. If a carbon-containing or nitrogen-containing gas is used as the purge gas, it typically will not decompose quickly enough to result in any undesirable deposits on the tip of nozzle 54.

Figure 5:
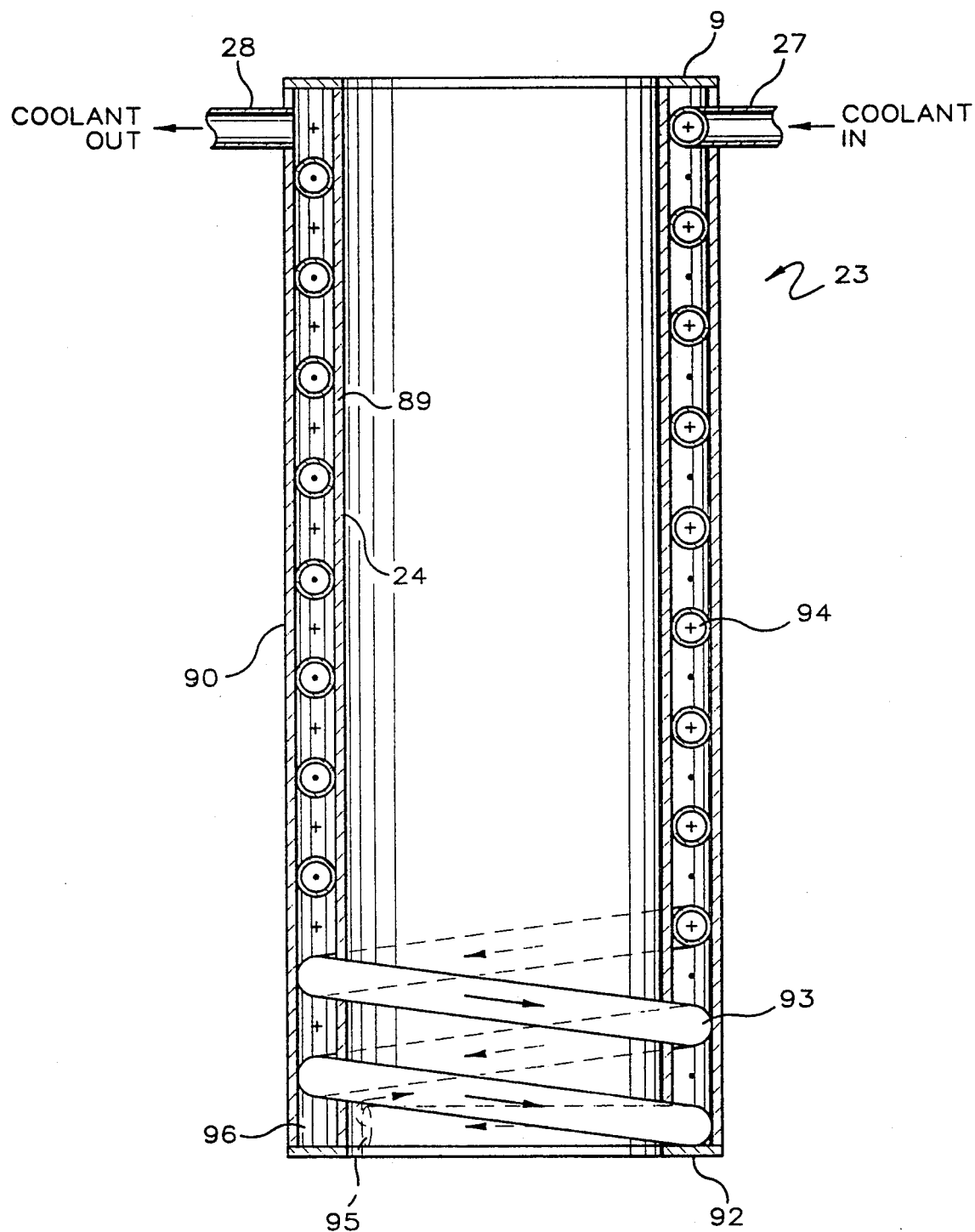
FIG. 5 is a partial cross-sectional view of the cooling assembly shown in FIG. 1.

Referring now to FIG. 5, a partial cross-sectional view of cooling assembly 23 is shown. Cooling assembly 23 includes an inner wall 89 having interior surface 24 and an outer wall 90 which surrounds inner wall 89 so as to be generally coaxial therewith. Each of inner and outer walls 89 and 90 can be constructed of any suitable metal, such as stainless steel, carbon steel, or nickel. In particular, inner wall 89 is preferably very thin (i.e. less than 1/10 inch) to enhance its heat transfer characteristics. As oriented in FIG. 5, the inner and outer walls 89 and 90 have upper and lower ends, preferably capped by generally annular metallic rings 91 and 92, respectively, which can be welded to such ends.

Disposed within the annular space defined between inner wall 89 and outer wall 90 is a coiled tube 93, of which an upper portion is shown in cross section and a lower section is shown as a side view. Coiled tube 93 is preferably spiral in shape as shown and extends around and along wall 89 between each of its ends so as to be in contact and heat exchange relationship therewith. Coiled tube 93 can be constructed of any suitable metal which will provide effective heat transfer characteristics, such as stainless steel, carbon steel, nickel or copper, and can be of the same or different material as the inner and outer walls. For optimum structural stability and optimum heat transfer, coiled tube 93 can be brazed or welded to the exterior surface of inner wall 89.

Defined within coiled tube 93 is a first passageway 94 which extends from cooling assembly inlet 27, adjacent to the upper ends of the inner and outer walls, to a coiled tube outlet 95 adjacent to the lower ends of the inner and outer walls. Coiled tube outlet 95 communicates with a generally spiral second passageway 96 which is defined between adjacent coiled portions of coiled tube 93 so as to extend along and in heat exchange relationship with inner wall 89 from the lower end to the upper end thereof, at which second passageway 96 communicates with cooling assembly outlet 28. It should also be apparent that the first and second passageways are in heat exchange relationship with each other, which is advantageous for reasons discussed below.

As previously stated, cooling assembly inlet 27 is connected to a suitable source of coolant fluid. The coolant fluid, preferably introduced as a liquid, can be any suitable heat exchange media such as water, oil, or ethylene gylcol, although water is preferred in view of its low cost and effectiveness as a heat exchange media. As shown, the coolant fluid flows through first passageway 94 in a first direction from the upper ends to the lower ends of the inner and outer walls, exits the coiled tube outlet 95 to flow into and through second passageway 96 in a second direction opposite to the first direction from the lower ends of the inner and outer walls to the cooling assembly outlet 28.

The flow of coolant fluid through cooling assembly 23 as discussed above effectively cools inner wall 89, to which its interior surface 24 is exposed to the reactions occurring therein, so as to minimize or eliminate formation of deposits on wall interior surface 24. Even if deposits form on wall interior surface 24, such deposits are easily removable since they formed on a relatively cool surface and thus only loosely adhere thereto. In FIG. 5, crosses indicate flow into the page and dots indicate flow out of the page. Uniform cooling of inner wall 89 is provided since coolant fluid flows in heat exchange relationship with inner wall along essentially its entire length. There is a substantial absence of "dead" zones in which there is no direct heat exchange between the coolant fluid and inner wall 89. Moreover, heat exchange between first passageway 94 and second passageway 96 allows cooling of the coolant fluid as it flows through second passageway 96 to cooling assembly outlet 28 in heat exchange relationship with incoming coolant fluid flowing through first passageway 94. This assists in maintaining the coolant fluid in the liquid state throughout both passageways for optimum heat transfer effectiveness. Heat exchange between the passageways in this manner also serves to enhance the uniformity of the cooling effect along the length of inner wall 89.

Figure 6:
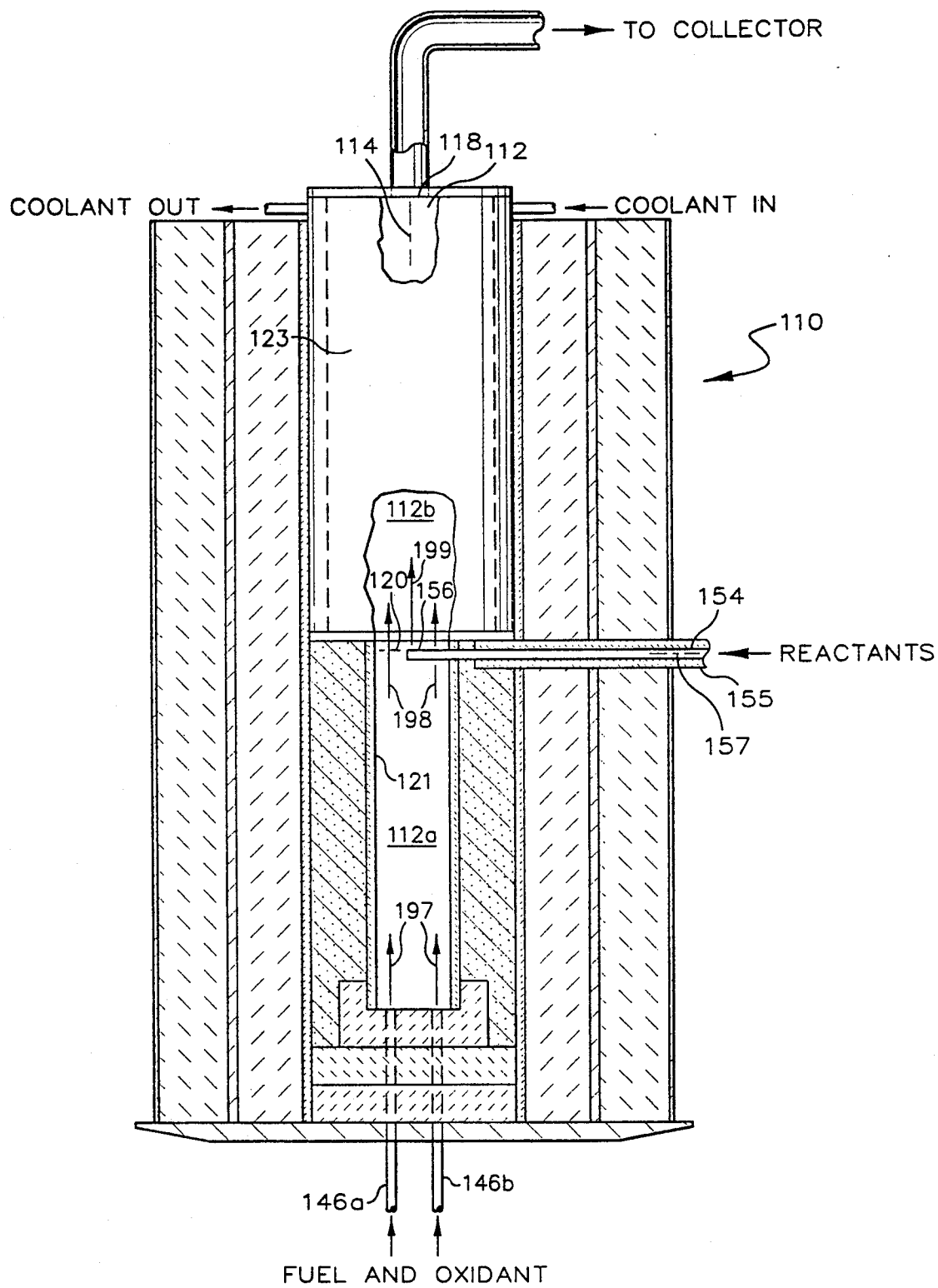
FIG. 6 is a partial cross-sectional view of a reactor in accordance with the invention and having a radially extending reactant nozzle.

Referring now to FIG. 6, there is shown a reactor 110 in accordance with another embodiment. The structure of the various refractory layers of reactor 110 is substantially similar to that shown in FIG. 1. The combustion nozzles, of which 146a and 146b are shown in FIG. 6, are positioned similarly to that shown in FIGS. 1 and 2 and are of the same structure as that shown in FIG. 3. In addition, reactor 110 includes a cooling assembly 123 like that cooling assembly shown in FIGS. 1 and 5. This embodiment differs from the FIG. 1 embodiment with respect to the reactant nozzle 154 which is received within a refractory tube 155 so as to radially extend through the various refractory layers and into chamber 112. As shown, the longitudinal axis 157 of nozzle 154 is generally perpendicular to the longitudinal axis 114 of chamber 112. Although not visible in FIG. 6, nozzle 154 has an outlet indicated at 156 which is positioned substantially on chamber axis 114 so as to face downstream end 118 of chamber 112.

Figure 7:
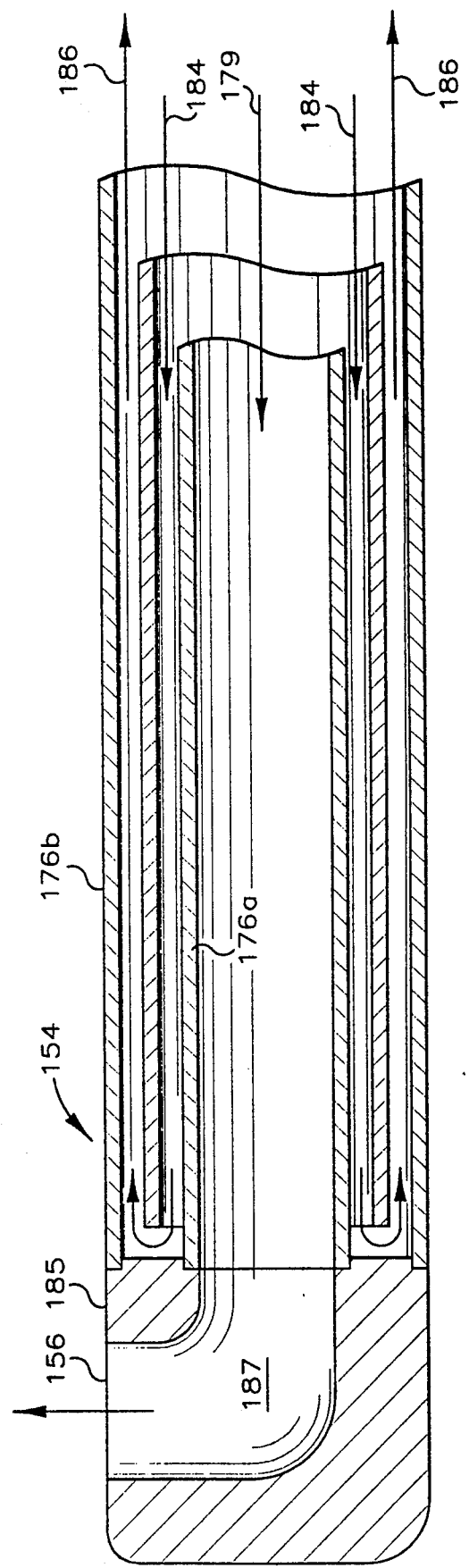
FIG. 7 is an enlarged cross-sectional view of the reactant nozzle which is shown in FIG. 6.

Referring to FIG. 7, there is shown a cross-sectional view of reactant nozzle 154. Reactant nozzle 154 includes tubular members 176a and 176b which are oriented similarly to that of inner and outer sidewalls 76a and 76b of reactant nozzle 54. Coolant fluid flows in the passage defined between tubular members 176a and 176b as per entry paths 184 and exit paths 186, and reactants are received through the interior of tubular member 176a as indicated at 179. Reactant nozzle 54 further includes a tip 185 which is connected to the ends of tubular members 176a and 176b by suitable means, such as welds. An L-shaped passage 187 is defined through tip 185 so as to extend from a first end communicating with the interior of tubular member 176a to a second end which defines outlet 156. Preferably, tip 185 is composed of a metal such as nickel or copper which has a high thermal conductivity, thereby enabling quick transference of heat from tip 185 to the coolant fluid so as to avoid overheating and possible melting of the tip. It may be noted that means is not provided in reactant nozzle 154 for providing a flow of purge gas around the reactants. This feature is omitted in this embodiment solely for the sake of simplicity of construction, and could be provided in reactant nozzle 154 if desired.

The various gas and coolant fluid flows in the above-described embodiment are preferably established and controlled by conventional equipment not shown in the drawings. Gas can be supplied by, for example, pressurized gas bottles. The gas can pass from such a pressurized container and through an orifice plate whose orifice is sized to achieve sonic velocity of the gas. Such a sonic velocity prevents pressure disturbances from traveling upstream, so that whatever happens downstream near the reactor will not affect the desired flow rate of gas. A pressure regulator can be employed to control the rate of flow of the gas. Coolant fluid can be supplied to cooling assembly 23 and the various nozzles by conventional means, such as a storage tank and associated pump, or in the case of water as the coolant fluid can be most conveniently supplied by connection to a municipal water tap.

Turning now to another aspect of the invention, there is provided a method of making a ceramic product, wherein such product can contain either a carbide compound or a nitride compound depending on reactants selected and process conditions discussed further below.

As used herein and in the appended claims, a carbide compound is defined as a compound of a first elemental component and a second, carbon component, and a nitride compound is defined as a compound of a first elemental component and a second, nitrogen component. According to a preferred embodiment, such compounds are produced by reacting two reactants, where a first reactant contains the first component and a second reactant contains the second component, although it is within the scope of the invention to use only a single reactant as will be discussed subsequent to the discussion of the preferred embodiments.

According to certain broad aspects of the carbide production method, the first component as contained in the first reactant may be any element capable of combining with carbon to form a carbide compound. For example, the first component may be a metal such as tungsten, chromium, titanium, zirconium, molybdenum or iron. Halides of such metals are particularly suitable as the first reactant. Or, the first component may be a metalloid such as boron or silicon.

According to certain broad aspects of the nitride production method, the first component as contained in the first reactant may be any element capable of combining with nitrogen to form a nitride compound. For example, the first component may be a metal such as aluminum, tungsten, chromium, titanium, zirconium or molybdenum, of which halides are suitable as the first reactant. Or, as is the case in carbide production, the first component may be a metalloid such as boron or silicon.

As stated previously, silicon carbide and silicon nitride are very useful compounds. Ceramic parts can be made from silicon carbide or silicon nitride powders which have excellent mechanical strength and heat resistance. Therefore, reactants having silicon as the first component are of particular interest in connection with the present invention.

Preferred first, silicon-containing reactants which are compounds of silicon and useable in either carbide or nitride production include silane ($SiH_4$) and substituted silanes. As used herein and in the appended claims, a substituted silane can be generally expressed by the formula SiABCD where each of A, B, C and D can be any element or combination of elements as long as at least one of A, B, C and D is not hydrogen, and where A, B, C and D can be the same or different. For example, any one of A, B, C and D can be selected from hydrogen, a halogen, an oxygen-containing group (i.e. $OSi(CH_3)_3$), a nitrogen-containing group (i.e. $NHSi(CH_3)_3$), an alkyl group, an aryl group, a silyl group, or a group containing multiple silicon atoms. Examples of such substituted silanes include: alkyl silanes such as methylsilane (($CH_3)SiH_3$), dimethylsilane (($CH_3)_2SiH_2$), trimethylsilane (($CH_3)_3SiH$) and tetramethylsilane ($Si(CH_3)_4$); halogenated silanes such as dichlorosilane ($H_2SiCl_2$); halogenated methylsilanes such as trimethyl silicon bromide (($CH_3)_3SiBr$) and dichlorodimethylsilane (($CH_3)_2SiCl_2$); siloxanes such as hexamethyldisiloxane (($CH_3)_3SiOSi(CH_3)_3$); silazanes such as hexamethyldisilazane (($CH_3)_3SiNHSi(CH_3)_3$); and silicon halides such as silicon tetrachloride ($SiCl_4$). Cyclic and polymeric silicon compounds are also within the scope of the invention. If desired, mixtures of any of the preceding silicon-containing compounds can be employed. Silane is the presently preferred silicon-containing reactant in view of the quality of the product.

The second, carbon-containing reactant in the case of carbide production is preferably a $C_1$–$C_9$ carbon compound such as an alcohol or a hydrocarbon. Suitable alcohols include ethanol and propanol. A hydrocarbon is presently most preferred and can be selected, by way of example, from the following group: methane, ethane, propane, butane, pentane, hexane, heptane, octane, nonane, ethylene, propylene, acetylene, benzene, toluene, cyclopropane, cyclobutane, cyclopentane, cyclohexane, and mixtures thereof. Although such $C_1$–$C_9$ carbon compounds are preferred, any carbon-containing reactant capable of reacting with the first reactant to form a carbide compound is within the scope of certain aspects of the invention.

The second, nitrogen-containing reactant in the case of nitride production is preferably a hydronitride such as ammonia ($NH_3$), which is presently preferred, or hydrazine ($N_2H_4$). Although hydronitrides are preferred, any nitrogen-containing reactant capable of reacting with the first reactant to form a nitride compound is within the scope of certain aspects of the invention. Additional examples of suitable nitrogen-containing reactants include, for example, amines and nitrogen halides such as $NCl_3$.

The fuel is preferably an unsaturated hydrocarbon (having at least one double or triple bond between carbon atoms), such as, for example, ethylene, propylene, butene, propadiene, butadiene, acetylene, propyne, butyne and mixtures thereof. A particularly preferred unsaturated hydrocarbon fuel is a mixture of ethylene and acetylene. Employing acetylene in the fuel has been found to increase the temperature in the reaction zone, discussed further below, as compared to ethylene alone, for example, which is desirable to minimize the oxygen content in the product powder and which is further desirable where a reactant such as dichlorodimethylsilane is used which requires a higher temperature than some other reactants to achieve a desirable reaction rate. Another preferred group of hydrocarbon fuels are cyclic hydrocarbons such as cyclopropane, cyclobutane, and mixtures thereof. Other types of fuels, such as solid fuels substantially comprising pure carbon, and fuel blends are within the scope of certain aspects of the invention so long as the desired temperature conditions and carbon to oxygen ratio, later discussed, are achieved in the reactor.

The oxidant employed should be capable of accepting electrons from the fuel and is preferably an oxygen-containing gas, most preferably pure oxygen. Gaseous mixtures which include oxygen as a single component, such as air, are within the scope of the invention.

A preferred operating procedure will now be described with reference to the apparatus of FIGS. 1–5.

Flow of coolant fluid is first started through nozzles 46a–c and 54, as well as through cooling assembly 23. Coolant fluid flow rates are preferably sufficient to maintain the coolant fluid in the liquid state during operation of the reactor to thereby optimize the cooling effect of the coolant fluid. Such flow rates can vary widely, depending on the size of the reactor. Typical flow rates for a reactor, such as is described in subsequent examples, are in the range of about 0.5 to about 1.5 gal/min for the various nozzles, and in the range of about 7.5 to about 12.5 gal/min for the cooling assembly.

The reactor is now preferably gradually heated to normal operating temperatures to avoid thermal shock to and possible breakage of various refractory materials. One method for this preheating stage involves initial electrical heating of the refractory layers with electrical rod heaters (not shown) and heating of chamber 12 with a coiled wire electrical heater (not shown) inserted into chamber 12, followed by establishment of a combustion flame in combustion zone 12a.

In any event, the combustion flame is established in combustion zone 12a by initiating a flow of gaseous fuel through nozzles 46a-c. If the reactor has been preheated electrically, the fuel should spontaneously establish a flame by reacting with ambient air at downstream end 18 of chamber 12. If the combustion flame does not form, the fuel may be ignited with an appropriate ignition device. After the flame is established, a flow of air is initiated through nozzles 46a-c so as to produce a fuel/air mixture. This causes the flame to propagate upstream so that the flame establishes itself in combustion zone 12a. Propagation of the flame in this manner can be hazardous to an operator implementing the method such that adequate safety precautions are taken. The reactor is typically operated with this fuel/air mixture for a predetermined period, usually one-half hour to one hour. Operation of the reactor with air as the oxidant is part of the preliminary start-up of the reactor to gradually heat the reactor.

A flow of pure oxygen is now commenced through nozzles 46a-c to replace the air. The flow of such oxygen is gradually increased and the flow of air gradually decreased until a fuel/oxygen combustible mixture is obtained. The combustion flame should be monitored visually through downstream end 18 to make sure that the flame does not flash back upstream so as to enter nozzles 46a-c and cause a potentially dangerous condition. Flashback can be prevented by providing a sufficiently high velocity of fuel and oxygen exiting each of nozzles 46a-c.

A flow of the fuel/oxygen mixture is thus established in a direction generally parallel to axis 14 as indicated at 97, and the fuel and oxygen flow rates are set to be relatively fuel-rich in preparation for ceramic production. The elemental molar ratio of carbon to oxygen for the fuel/oxygen mixture is preferably at least about 0.7:1, more preferably in the range of about 0.8:1 to about 1.2:1, and most preferably in the range of about 0.9:1 to about 1.1:1. As used herein, the elemental molar ratio of carbon to oxygen means the molar ratio of carbon atoms to oxygen atoms. The residence time of the combustible mixture and hot combustion products formed therefrom in combustion zone 12a is typically about 5 to about 20 milliseconds, which is sufficient time to consume substantially all of the oxygen before reaching boundary 20. As discussed previously, this is desirable to avoid the production of unwanted oxides. Temperature conditions in combustion zone 12a are typically about 1700° C. to about 2000° C. Hot combustion products produced in combustion zone 12a flow toward and into the reaction zone 12b as indicated at 98.

The substantially gaseous reactants are now injected into chamber 12 from reaction nozzle outlet 56, as indicated at 99, such that the reactants exit outlet 56 at boundary 20 in a direction generally parallel to the chamber axis 14, preferably generally along chamber axis 14 and toward downstream end 18. Such injection of reactants generally parallel to chamber axis 14 is particularly desirable in minimizing wall deposits. In the illustrated embodiment, the first and second reactants are preferably premixed to give a desired molar ratio of first component to carbon or nitrogen in the reactants, typically about 1:2 to about 1:4 in the case of carbide production or about 1:1 to about 1:4 in the case of nitride production where silicon is the first component. Such a mixture is passed through reactant nozzle 54 so as to exit outlet 56 into chamber 12. If the first reactant employed is normally a liquid, such first reactant is placed in vapor form most conveniently by placing it in a temperature controlled bubbler and passing a purge gas therethrough. The temperature of the coolant fluid flowing through reactant nozzle 54 can be elevated to the necessary extent to help prevent condensation of the first reactant as it passes through reactant nozzle 54.

Flow rates are adjusted so that the elemental molar ratio of carbon to oxygen for the combination of the reactants and fuel/oxygen mixture is as follows: in carbide production at least about 0.8:1, more preferably in the range of about 0.9:1 to about 1.5:1, and most preferably in the range of about 1:1 to about 1.3:1; and in nitride production at least about 0.7:1, more preferably in the range of about 0.8:1 to about 1.2:1, and most preferably in the range of about 0.9:1 to about 1.1:1. Although the reactions occurring in reaction zone 12b are numerous and not completely understood, it is believed that the above cited carbon to oxygen ratios minimize the production of undesirable oxidizing species such as carbon dioxide and water, and produce partial pressures of reducing gases like carbon monoxide and hydrogen which are favorable to the production of carbides or nitrides. The preferred carbon to oxygen ratios for the fuel/oxygen mixture previously discussed (preferably at least about 0.7:1, more preferably about 0.8:1 to about 1.2:1, and most preferably about 0.9:1 to about 1.1:1) particularly enhance these conditions favorable to the production of carbides or nitrides. In addition, reactor temperature is somewhat dependent on the carbon to oxygen ratio, and temperatures conductive to carbide or nitride formation are achievable using the above-discussed carbon to oxygen ratios.

It is generally preferred to employ a mass ratio of no more than about 0.3. As used herein and in the appended claims, the term "mass ratio" is defined as the ratio of the synthesis rate (i.e. g/min) to the total mass flow rate (i.e. g/min) of the fuel plus oxidant into combustion zone 12a. The term "synthesis rate" (i.e. g/min) is defined as $(m \times f)/n$, where m represents the molecular weight (i.e. g/gmole) of the carbide or nitride compound, f represents the total molar flow rate (i.e. gmoles/min) of first component atoms into reaction zone 12b, and n represents the number of first component (i.e. silicon) atoms in the carbide or nitride compound. The synthesis rate is a theoretical value which is proportional to the flow rate of the first reactant and which assumes 100% reaction of the first component atoms to form the carbide or nitride compound. Of course, in actual practice, such 100% conversion does not occur and some losses can occur due to formation of wall deposits.

Temperature conditions for at least a portion of reaction zone 12b are as follows: in carbide production, at least about 1400° C., preferably in the range of about 1400° C. to about 1700° C., and most preferably in the range of about 1500° C. to about 1600° C.; and in nitride production, at least about 1300° C., preferably in the range of about 1300° C. to about 1700° C., and most preferably in the range of about 1400° C. to about 1600° C. The temperature conditions in the reactor can most conveniently be monitored by means of a thermocouple (not shown) positioned in one of the refractory layers. The temperature detected by the thermocouple can be correlated to actual temperature conditions in the reactor. Of course, a thermocouple can be positioned directly in the chamber 12, but this requires use of expensive materials such as platinum and/or rhodium which are still subject to deterioration due to the high temperatures in chamber 12.

Pressure conditions in reaction zone 12b are preferably at or near atmospheric pressure. Other operating pressures are within the scope of the invention.

In reaction zone 12b, a product powder is formed from the reactants which includes the desired carbide or nitride compound and other components as is discussed further below. The product powder exits the reactor through downstream end 18 and passes into and through conduit 60 to the collector. After the desired amount of product powder is collected, the reactor is shut down by first switching to air as the oxidant and then gradually decreasing the fuel/oxidant flow rates to provide gradual cooling of the reactor. After shutdown, the reactor is typically allowed to cool for several hours before the supply of coolant fluid to the nozzles and cooling assembly is terminated.

Operation of the embodiment shown in FIGS. 6 and 7 is performed in a similar manner to that procedure described for the embodiment of FIGS. 1-5. A mixture of fuel and oxidant, preferably pure oxygen, is injected from the combustion nozzles into combustion zone 112a in a direction generally toward reaction zone 112b as indicated at 197. Hot combustion products produced in combustion zone 112a flow generally toward and into reaction zone 112b as indicated at 198. Although the arrows at 198 are shown as straight to indicate the general directional flow of combustion products, it should be understood that some turbulence results from flow around reactant nozzle 154. Finally, reactants exit outlet 156 of reactant nozzle 154 at boundary 120 in a direction generally along chamber axis 114 and toward downstream end 118 as indicated at 199.

In the following description of products produced in accordance with the invention, it is to be understood that the term "weight percent" as applied to a component of a composition is based on the total weight of the composition.

The product powder as collected directly from the reactor in accordance with the carbide production method, hereafter denoted as carbide product powder, is generally black or brown in appearance, and in the case of silicon as the first elemental component, contains silicon carbide, silicon and carbon in addition to that in the silicon carbide, and oxygen. Such a raw product powder is characterized by the following weight percentages: silicon in the amount of about 30 to about 75 weight percent, preferably in the amount of about 50 to about 70 weight percent, and most preferably in the amount of about 55 weight percent to about 70 weight percent; carbon in the amount of about 15 to about 50 weight percent, preferably in the amount of about 20 to about 45 weight percent, and most preferably in the amount of about 30 to about 40 weight percent; and oxygen in the amount of about 1 to about 30 weight percent, preferably in the amount of about 1 to about 20 weight percent, and most preferably in the amount of about 1 to about 10 weight percent. Hydrogen can also be present in the carbide product in minor but detectable amounts of between about 0 and about 1 weight percent. Such carbide product powder is further characterized by particles having diameters of about 0.01 to about 0.3 micron.

The product powder as collected directly from the reactor in accordance with the nitride production method, hereafter denoted as nitride product powder, is generally tan or white in appearance, and in the case of silicon as the first component, contains silicon nitride, silicon in addition to that in the silicon nitride and at least some of which may be in elemental form, carbon and oxygen. Such a raw product powder is characterized by the following weight percentages: silicon in the amount of about 40 to about 75 weight percent, preferably in the amount of about 50 to about 70 weight percent, and most preferably in the amount of about 55 weight percent to about 65 weight percent; nitrogen in the amount of about 10 to about 40 weight percent, preferably in the amount of about 15 to about 35 weight percent, and most preferably in the amount of about 25 to about 35 weight percent; carbon in the amount of about 1 to about 10 weight percent, preferably in the amount of about 1 to about 6 weight percent, and most preferably in the amount of about 1 to about 3 weight percent; and oxygen in the amount of about 1 to about 30 weight percent, preferably in the amount of about 1 to about 20 weight percent, and most preferably in the amount of about 1 to about 15 weight percent. Hydrogen can also be present in the nitride product in minor but detectable amounts of between 0 and about 1 weight percent. The nitride product powder is further characterized by particles having diameters of about 0.01 to about 0.5 micron.

Either raw product can be sintered into heat resistant, high strength parts in a conventional manner. For example, appropriate amounts of additives such as yttrium oxide and aluminum oxide can be added to such product, followed by pressing to a desired shape and heating at a temperature of about 1700° C. to about 2400° C. when sintering the carbide product, or at a temperature of about 1500° C. to about 1900° C. when sintering the nitride product.

Other variations of the embodiments described above can involve different reactants and/or fuels. For example, it is possible to use excess carbon from the fuel and/or the first reactant in carbide production as the source of carbon for producing the carbide compound, in which case the second, carbon-containing reactant can be omitted. Similarly, it is possible in nitride production to use nitrogen from the first reactant (i.e. silazane) or nitrogen produced in the combustion zone as the source of nitrogen for producing the nitride compound, in which case the second, nitrogen-containing reactant can be omitted. It is desirable in such embodiments to utilize a carrier gas, such as helium, argon, hydrogen, carbon monoxide or mixtures thereof in admixture with the first reactant to carry the first reactant into the reactor chamber. Another possible variation could involve employing a fuel which includes a preferred unsaturated hydrocarbon as well as amounts of other types of hydrocarbons such as saturated hydrocarbons. However, this will generally decrease the heat produced by the combustion reaction so as to possibly require a supplemental heat source (i.e. electric, plasma, microwave, or combustion zones exterior to the reactor chamber but in heat exchange relationship with the reactor chamber, etc.) to obtain the desired temperature conditions in the reaction zone.

EXAMPLES

Specific examples will now be described to further illustrate the invention. These examples should not be construed to limit the invention in any manner.

In each of the following examples, various gaseous flow rates are given in gram moles/minute (abbreviated to gmol/min hereinafter). Actual measurements of flow rate were taken volumetrically at room temperature and atmospheric pressure in units of liters/minute. These volumetric measurements were converted to gmol/min by assuming there are 24.45 liters/mole for any gas at 25° C. (room temperature) and at atmospheric pressure. All flow rates for gases below are undiluted with any other gases (i.e. carrier gases).

Water was employed as the coolant fluid in each example, as supplied from a municipal water tap. Coolant fluid flow in the various nozzles was about 1 gal/min, and coolant fluid flow in the cooling assembly was about 10 gal/min.

With respect to elemental analysis results given in various tables, the carbon and nitrogen weight percentages were obtained by means of CHNS combustion analysis, silicon percentages by X-ray fluorescence analysis, and the oxygen percentages by neutron activation analysis. In each example where an elemental analysis was performed, CHNS analysis revealed detectable amounts of hydrogen. However, such detected amounts of hydrogen were less than 1 weight percent and are not reported in the following examples. Weight percentage results which are provided have not been normalized to 100%. Variance from 100% is attributable to normal analysis inaccuracies.

Deposits on the reactor chamber walls are mentioned in several runs hereafter described. Such deposits were not measured quantitatively, but visual observations were made after the completion of various runs. These observations are given in subsequent examples in terms of "light", "medium" and "heavy" to reflect the comparability of deposits obtained for the various runs.

With respect to terminology and notations used hereafter, it will be understood that all degree readings obtained by X-ray diffraction are for an angle of $2\theta$.

EXAMPLE I

The purpose of this example is to demonstrate the formation of silicon carbide with a reactor substantially similar to that shown in FIGS. 1-5 without the formation of significant wall deposits.

The reactor of this example did not employ insulation around the reactant nozzle as is shown in FIG. 1. All nozzles and cooling assembly components were of a stainless steel construction. A Dacron ® polyester filter bag was used to collect product powder exiting from a quartz conduit having one end in communication with the downstream end of the reactor. Important reactor dimensions are given in Table IA.

TABLE IA

| Item | Dimension |
|---|---|
| Overall O.D. of Reactor 10 | 32.4 cm |
| I.D. of Tube 21 | 5.08 cm |
| Length of Tube 21 | 26 cm |
| O.D. of Tubular Member 62 | 0.953 cm |
| I.D. of Tubular Member 62 | 0.216 cm |
| O.D. of Tubular Member 74 | 0.318 cm |
| I.D. of Tubular Member 74 | 0.236 cm |
| O.D. of Tubular Member 76 | 0.953 cm |
| I.D. of Tubular Member 76 | 0.395 cm |
| O.D. of Cooling Assembly 23 | 17.8 cm |
| I.D. of Cooling Assembly 23 | 15.2 cm |
| Length of Cooling Assembly 23 | 45.7 cm |
| O.D. of Coiled Tube 93 | 1.27 cm |
| I.D. of Coiled Tube 93 | 1.09 cm |

Using the above described apparatus, three runs were made using a mixture of ethylene and acetylene as the fuel and pure oxygen as the oxidant. Flow rates for the ethylene, acetylene and oxygen were 1.26 gmol/min, 0.32 gmol/min and 1.57 gmol/min, respectively. Accordingly, the elemental ratio of carbon to oxygen for the combustible mixture only (combustion C:O ratio) was 1.01. Reactants employed were silane at a flow rate of 0.068 gmol/min and propylene at a flow rate of 0.108 gmol/min to give a synthesis rate of 2.7 g/min. Helium at a flow rate of 0.124 gmol/min was purged through the reactant nozzle. The elemental molar ratio of carbon to oxygen for the combination of the reactants and combustible mixture (overall C:O ratio) was 1.11. The run time was 20 minutes and the product mass was not recorded. The reactant nozzle outlet location and product elemental analysis for each of the three runs are given in Table IB. Reactant nozzle outlet location is indicated as the longitudinal distance of such outlet from the upstream end of the chamber.

TABLE IB

| Run No. | Reactant Nozzle Outlet Location (cm) | Product Analysis, (wt. %) | | |
|---|---|---|---|---|
| | | Si | C | O |
| 1 | 26.0 | 62.8 | 18.9 | 17.5 |
| 2 | 23.5 | 64.7 | 16.3 | 17.3 |
| 3 | 21.0 | 65.6 | 15.9 | 18.0 |

Powder X-ray diffraction patterns obtained for products resulting from runs 1-3 exhibit broad peaks between 30° and 40°, which is taken to indicate the presence of poorly crystallized beta silicon carbide.

Wall deposits were observed after each of runs 1-3. There were no deposits on the wall of tube 21 (FIG. 1) and only a very light deposit film on wall 89 of cooling assembly 23 (FIGS. 1 and 5).

EXAMPLE II

The purpose of this example is to further demonstrate the production of silicon carbide with the apparatus of Example I, but with slightly different process conditions and different reactant nozzle outlet locations.

Process conditions of this example differ from Example I insofar as the ethylene flow rate was 1.30 gmol/min, thus giving a combustion C:O ratio of 1.03, an overall C:O ratio of 1.14 and a mass ratio of 0.028. Four runs were carried out at different reactant nozzle outlet locations as measured longitudinally from the upstream end of the reactor. Product analysis results are given for each of runs 4-7 in Table II.

TABLE II

| Run No. | Reactant Nozzle Outlet Location (cm) | Product Analysis, (wt. %) | | |
|---|---|---|---|---|
| | | Si | C | O |
| 4 | 21.0 | 64.6 | 16.2 | 22.4 |
| 5 | 19.5 | 60.8 | 16.4 | 22.9 |
| 6 | 18.0 | 63.4 | 17.9 | 24.7 |
| 7 | 16.5 | 56.0 | 21.7 | 25.4 |

Powder X-ray diffraction patterns for products resulting from runs 4–7 exhibit peaks as follows: run 4—broad peak at 35°; run 5—distinct peak at 35° and also broad, poorly defined shoulders at 60° and 72°; run 6—distinct peaks of greater amplitude than those of run 5 at 35°, 60° and 72°; run 7—distinct peaks of greater amplitude than those of run 6 at 35°, 60° and 72°, but with a well defined, broad shoulder between 15° and 30° indicative of carbon and silicon-oxygen bonds. Each X-ray diffraction pattern is taken to indicate the presence of beta silicon carbide, with a notable increase in crystallinity as the reactant nozzle outlet is moved closer to the upstream end of the reactor along with an increase in carbon and molecular structures with silicon-oxygen bonds.

Moreover, with respect to deposits, it was observed that deposits on the wall of tube 21 (FIG. 1) increased as the reactant nozzle outlet was moved closer to the upstream end of the reactor. No deposits on the wall of tube 21 were observed at the end of runs 4 or 5, but light deposits were observed at the end of run 6, and heavy deposits at the end of run 7. Only a light deposit film was observed on wall 89 of cooling assembly 23 (FIGS. 1 and 5) at the end of each run.

EXAMPLE III

The purpose of this example is to demonstrate the production of silicon carbide using an apparatus substantially similar to that shown in FIGS. 6 and 7.

Dimensions of the reactor of this example were substantially the same as those cited for the reactor of Example I, with the exception of the I.D. of tubular member 176a, which was 0.333 cm. Of course, the embodiment of the reactant nozzle of FIG. 7 does not include a tubular member analogous to tubular member 74. In addition, the reactant nozzle outlet 156 was positioned at a longitudinal distance of about 25 cm from the upstream end of the reactor.

Process conditions of this example were the same as employed in Example I except for a run time of 40 minutes. A total of 23 grams of product was collected.

Elemental analysis revealed 64.2 wt. % silicon, 9.1 wt. % oxygen and 27.0 wt. % carbon.

The powder X-ray diffraction pattern for the product revealed distinct peaks at 35°, 60° and 72°, indicative of the presence of beta silicon carbide.

As to deposits, there was only a light deposit film on the cooling assembly inner wall at the end of this run, and also light deposits on the wall of tube 121 and tip of reactant nozzle 154. The latter deposits are believed to be due to the turbulence created by the gas flows around the radially extending reactant nozzle which can cause some flow of reactants into the combustion zone.

EXAMPLE IV

The purpose of this example is to demonstrate the production of silicon nitride with the reactor described in Example III.

The run of this example employed the same flows of combustible mixture components and silane as were used in Example III. Ammonia was used as the second reactant at a flow rate of 0.108 gmol/min to give a synthesis rate of 3.2 g/min. Other process data include an overall C:O ratio of 1.01, a mass ratio of 0.034 and a run time of 6 minutes. Product mass collected was not recorded.

Elemental analysis of the product revealed 66.8 wt. % silicon, 20.63 wt. % nitrogen, 9.1 wt. % oxygen and 5.0 wt. % carbon. Such results are taken to indicate the presence of silicon nitride. Considering other possible bonding of the nitrogen to other elements, nitrogen in combination with carbon or oxygen can generally form only gaseous compounds. Therefore, it is reasonable to assume that the nitrogen present in the solid product is bound to at least a portion of the silicon.

X-ray powder diffraction analysis of the product produced by this run resulted in a diffraction pattern having a very broad peak between about 20° and about 40°. This broad peak is taken to indicate the presence of poorly crystallized silicon nitride, and is believed to result from the overlapping of a plurality of peaks which characterize silicon nitride. The X-ray diffraction pattern also includes additional peaks indicating the presence of additional crystalline components, including beta silicon carbide and crystalline elemental silicon. Peaks superimposed on the above-mentioned broad peak at 28.5° and 35° are indicative of crystalline elemental silicon and beta silicon carbide, respectively, whereas peaks at 47.5°, 56°, 69° and 76° are taken to additionally indicate the presence of crystalline elemental silicon.

Deposits observed at the end of this run were similar to those observed in Example IV.

That which is claimed is:

1. An apparatus comprising:
    a reactor having a wall defining a chamber therein which has a longitudinal axis and longitudinally separated upstream and downstream ends, wherein the chamber comprises a combustion zone and a reaction zone such that the combustion zone longitudinally extends from the upstream end to a boundary between the zones and such that the reaction zone longitudinally extends from the boundary to the downstream end;
    combustible mixture injection means for injecting a combustible mixture into the combustion zone so as to flow toward and into the reaction zone;
    reactant injection means for injecting at least one reactant into the chamber at the boundary, wherein said at least one reactant is capable of reacting in the reaction zone to form a ceramic product;
    means for defining at least a first passageway and a second passageway which surround at least a portion of the wall defining at least a portion of the reaction zone so as to be in heat exchange relationship with said wall portion and so as to be in heat exchange relationship with each other; and
    coolant fluid means for flowing a coolant fluid through the first and second passageways.

2. An apparatus as recited in claim 1 wherein said wall portion has a first end positioned between the upstream and downstream ends of the chamber and a second end adjacent to the downstream end of the chamber such that said wall portion longitudinally extends between the first and second ends, and wherein the first and second passageways extend along said wall portion from the first end to the second end.

3. An apparatus as recited in claim 2 wherein the coolant fluid means flows coolant fluid through the first passageway in a first direction from one end to the other end of said wall portion and further flows coolant fluid through the second passageway in a second direction opposite the first direction from said other end to said one end.

4. An apparatus as recited in claim 3 wherein the first and second passageways are spiral in shape.

5. An apparatus as recited in claim 4 wherein said apparatus comprises a coiled tube which defines the first passageway therein and which has an inlet adjacent to said one end of said wall portion and an outlet adjacent to said other end of said wall portion, and wherein the second passageway is defined between adjacent coiled portions of the coiled tube so as to be in fluid communications with the coiled tube outlet and thereby receive the flow of coolant fluid therethrough upon exiting the coiled tube outlet.

6. An apparatus as recited in claim 5 wherein the coolant fluid means includes a source of coolant fluid connected to the coiled tube inlet and which supplies the coolant fluid to the coiled tube inlet as a liquid.

7. An apparatus as recited in claim 1 wherein said wall portion defines a first portion of the chamber which includes at least a portion of the reaction zone and which has a first diameter, and the remainder of the wall defines a second portion of the chamber which includes at least a portion of the combustion zone and which has a second diameter smaller than the first diameter.

8. An apparatus as recited in claim 7 wherein the boundary is adjacent to the first end of said wall portion.

9. An apparatus as recited in claim 1 wherein the reactant injection means injects said at least one reactant into the chamber in a direction generally parallel to the longitudinal axis of the chamber.

10. An apparatus as recited in claim 1 wherein the reactant injection means comprises a source of said at least one reactant and a reactant nozzle connected thereto and having an outlet which communicates with the chamber at the boundary.

* * * * *